May 10, 1949. J. L. SOLOMON 2,469,934
ELECTRONIC CONTROL FOR WELDING MACHINES
Filed Aug. 26, 1944 2 Sheets-Sheet 1

INVENTOR.
Julius L. Solomon,
BY
Wilkinson Huxley Byron & Knight
ATTYS.

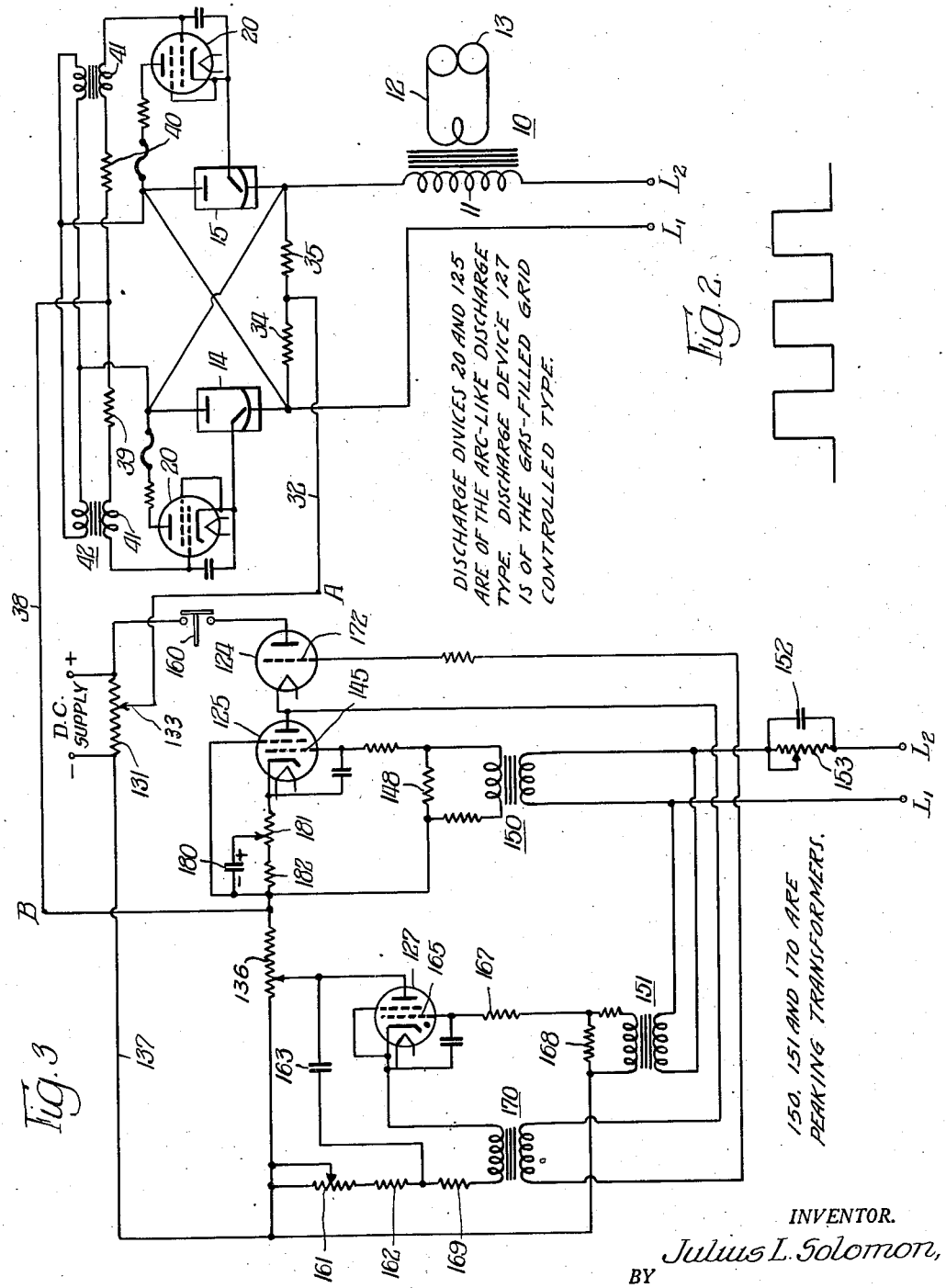

Patented May 10, 1949

2,469,934

UNITED STATES PATENT OFFICE 2,469,934

ELECTRONIC CONTROL FOR WELDING MACHINES

Julius L. Solomon, Chicago, Ill., assignor to Welding Research, Inc., Chicago, Ill., a corporation of Illinois Application August 26, 1944, Serial No. 551,403

6 Claims. (Cl. 250—27)

1

The invention relates to electronic control systems for welding machines and has reference more particularly to an improved system for controlling the current supplied to a load in a manner whereby the on time and the off time periods of current flow may be varied over a wide range in steps of one cycle of the supply line frequency.

A basic object of the invention resides in the provision of an electronic control system which will operate in a manner to alternately reverse the polarity across two terminals. In the application of such a system to welding the said terminals are electrically connected to the control grids of igniter valves for firing electric discharge valves whereby the welding circuit may be energized from a conventional source of supply such as sixty-cycle alternating current.

Another object of the invention is to provide an improved electronic control system that may be used for measuring current drawn by a load in steps of one cycle of the supply line frequency, a system which will control accurately and independently the duration of the on time current periods and the off time periods, and a system wherein the duration of either period may be changed without disturbing the previous setting of the other.

Another and more specific object of the invention is to provide an electronic control system for accomplishing the above objectives, which will employ a minimum of circuit elements, and which will produce a minimum transient condition in the line and load being controlled.

With these and various other objects in view the invention may consists of certain novel features of construction and operation as will be more fully described and particularly pointed out in the specification, drawings and claims appended hereto.

In the drawings which illustrate an embodiment of the invention and wherein like reference characters designate like parts—

Figure 2 is a view illustrating diagrammatically the rise and fall of the potential on the grids of the igniter valves; and Figure 3 is a view illustrating diagrammatically a modified control system also embodying the present invention.

Figure 1:
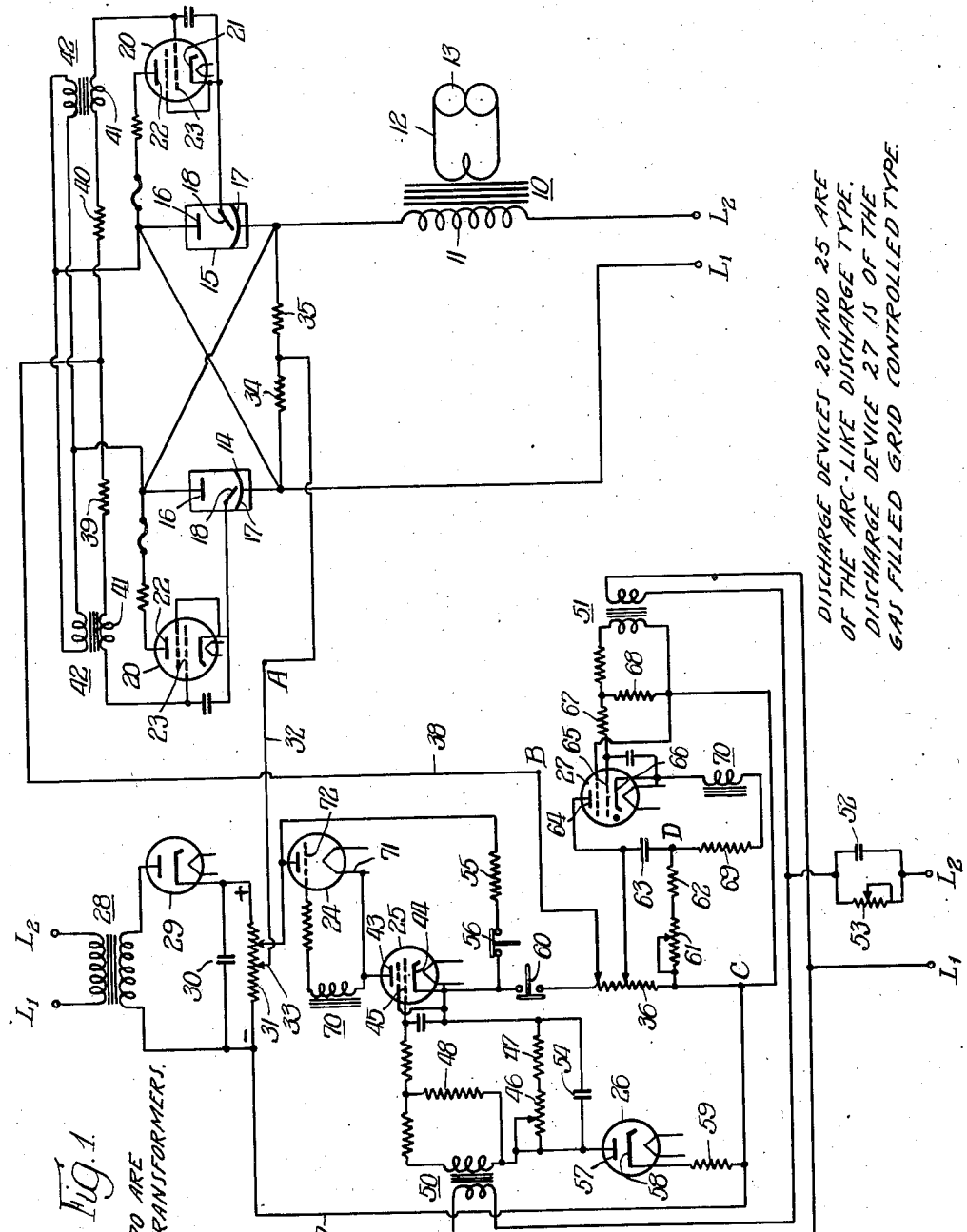
Figure 1 is a diagrammatic representation of an electronic control system embodying the present invention.

Referring to Figure 1, the invention is illustrated in a system for welding requiring control of the energy between an alternating current supply line, indicated by $L_1$ and $L_2$ and the primary 11 of a welding transformer 10 having a secondary winding 12 connecting with electrodes 13. Conventional sixty-cycle alternating current from the supply line flows through the primary 11 of the welding transformer under the control of the reversely connected electric discharge valves 14 and 15 which are connected back to back or in anti-parallel relation, as shown in said figure. The electric discharge valves are of the ignitron type comprising an envelope enclosing an anode 16, a cathode 17 of conducting liquid such as mercury, and an immersion igniter type of control member 18. When the electric discharge valves 14 and 15 are fired to render them conductive it is well understood that they will transmit current during both half cycles of the alternating supply to the primary 11 of the welding transformer. More particularly, the electric discharge valves are conductive when the anodes 16 are positive, provided the respective igniter 18 has fired the tube by conducting a predetermined minimum current for vaporizing the mercury of the cathode.

Ignition current is supplied by electric valves 20, 20 of the hot cathode arc-like type of valve having a cathode 21, a plate 22 and a control grid 23. The electronic control circuit for producing the on and off timing impulses comprises electric valves 24, 25, 26 and 27 and associated transformers, capacitors and resistors. For energizing the electronic control circuit a source of direct current is required, which is supplied from the conventional alternating current supply line $L_1$ and $L_2$ by the transformer 28, the rectifying valve 29, condenser 30 and resistance 31.

Terminal A has connection by means of a suitable conductor 32 with the slider 33 having contact with the resistor 31, and said terminal has connection at the opposite end of the conductor with resistors 34 and 35, the former connecting with cathode 17 of one of the ignitrons and the latter connecting with the cathode of the other ignitron. Terminal B is connected to resistor 36, which has connection through the conductor 37 with the negative side of the resistor 31 connected across the source of direct current supply as above explained. Terminal B is therefore maintained negative with respect to terminal A. Since terminal B has connection through conductor 38, the resistors 39 and 40 and the secondary windings 41 of the transformers 42 with the control grids 23, it will therefore be seen that said control grids 23 of the valves controlling the ignitrons are held negative with respect to their cathodes, thus holding said valves in the non-conducting state in which state the ignitrons are not fired.

Examining the grid circuit of tube 25, which is of the hot cathode arc-like type of electric valve containing a plate 43, a cathode 44 and a control grid 45, it will be understood that the potential from control grid to cathode consists of a direct current potential appearing across the resistance elements 46 and 47, in series with the voltage across resistor 48, which is a portion of the voltage developed across the secondary winding of the transformer 50, a transformer of the type commonly called a peaking transformer. Peaking transformers 50 and 51 are connected to the power line L1 and L2 through a resistance-capacity network including a condenser 52 and the variable resistance or potentiometer 53. The position of the secondary peak may be shifted in relation to the power line cycle by changing the position of the potentiometer.

The direct current voltage across the resistance elements 46 and 47, with condenser 54 in parallel, is maintained by the voltage across 31, the circuit including resistor 55, normally closed contact 56 to the cathode of tube 25, through parallel circuit 46, 47, 54, plate 57 of tube 26, cathode 58 of said tube, resistor 59, and returning by conductor 37 to the negative side of the direct current supply. The sense of the voltage across condenser 54 is such that the grid 45 of tube 25 is made negative with respect to its cathode 44. The voltage across condenser 54 is also greater than the peak of the voltage across 48 as applied by the peaking transformer 50.

When the initiating switch is thrown the normally closed contact 56 is caused to open and the normally open contact 60 is caused to close. Condenser 54 starts to discharge through resistance elements 46 and 47 at a rate depending upon the setting of the potentiometer in contact with resistance 46. The voltage impressed on the grid of tube 25 becomes less negative and finally a positive peak from the secondary of transformer 50 drives the grid of tube 25 beyond the critical voltage and tube 25 starts to conduct. At the instant tube 25 conducts terminal B is abruptly raised to a more positive potential than terminal A because of the voltage drop across resistor 36. When terminal B is raised to a more positive potential than terminal A the grids 23 of the valves 20 become positive with respect to their cathode, causing them to pass ignition current and fire the ignitrons 14 and 15.

Direct current from the source of direct current supply will at this time take a number of paths through the control circuit. Said paths may be described as follows:

Path No. 1.—From the negative side of resistor 31 through conductor 37, resistor 59, cathode to plate of tube 26, the parallel path 46, 47, 54, cathode to plate of tube 25, cathode to plate of tube 24, and returning to a positive point on resistor 31. This places a charge upon condenser 54 and makes the grid of tube 25 negative with respect to its cathode.

Path No. 2.—From the negative side of resistor 31, through conductor 37, resistor 36, the closed contact 60, cathode to plate of tube 25, cathode to plate of tube 24, and returning to a positive point on resistor 31. This makes terminal B positive with respect to point C.

Path No. 3.—From the negative side of resistor 31 through the conductor 37, potentiometer 61, resistor 62, condenser 63, resistor 36, closed contact 60, cathode to plate of tube 25, cathode to plate of tube 24, and returning to a positive point on resistor 31.

At the instant conduction starts the condenser 63 begins to charge and the voltage across 63 rises exponentially at a rate determined by the setting of the potentiometer 61. The charging current decreases exponentially and therefore the voltage drop across 61 and 62 starts from a high value and decreases in proportion to the charging current, point C being negative with respect to point D.

Referring to tube 27, which is of the gas-filled grid controlled type, the same includes a plate 64, a control grid 65 and a cathode 66. The grid circuit of said tube includes resistors 67, 68 across which is developed a portion of the voltage generated by the secondary winding of the peaking transformer 51. Said grid circuit also includes the potentiometer 61, resistor 62, resistor 69, the primary winding of transformer 70, and returning to the cathode 66 of said tube. In said grid circuit two potentials are developed, one across 61 and 62, which decreases as condenser 63 becomes charged, and the other across 68, which is a pulse of short duration developed by the secondary winding of the peaking transformer 51 and which appears every half cycle of the power line frequency. The position of this peak voltage across resistor 67 and 68 may be changed with reference to the power line cycle by adjusting the potentiometer 53 in the parallel resistance-capacity network.

As condenser 63 becomes charged and the voltage across 61, 62 decreases a period will eventually be reached when one of the positive pulses across resistor 68 will drive the grid of tube 27 beyond the critical point and this tube will fire, thus discharging condenser 63 through the resistor 69 and the primary winding of transformer 70. This sudden impulse of current through the primary winding of transformer 70 generates a high voltage across the secondary winding of said transformer, connecting with cathode 71 and grid 72 of tube 24, thus driving the grid of said tube 24 highly negative beyond the cut-off point. When tube 24 ceases to conduct this action prevents flow of current through said tube and the current accordingly ceases to flow through the paths 1, 2 and 3, above described. Tube 25 will not conduct since its grid is held negative by the charge on condenser 54. Condenser 54 discharges through the resistance elements 46, 47 at a rate depending upon the setting of the potentiometer in contact with 46. At the instant the voltage across 54 drops low enough so that one of the positive peaks generated by peaking transformer 50 makes the grid more positive than the critical grid voltage, the tube 25 will start conducting again and the circuit will go through the cycle as above described. Said cycle of operations will be repeated as long as the initiating switch maintains contact 56 open and contact 60 closed.

Terminal B will remain at a potential more negative than A for a preset number of cycles of the line frequency. Its potential will rise abruptly to a point less negative than point A and this will be maintained for a preset number of cycles of the line frequency, whereupon the potential of B will abruptly drop to the value it held initially. The voltage changes between terminals A and B will follow the general form of the pattern shown in Figure 2.

During the time that terminal B is negative with respect to terminal A, assuming that the control circuit has been energized, the igniter valves are maintained in a non-conducting state and this period is therefore the off current period, since no current will flow through the primary winding 11 of the welding transformer. The reverse is the case when terminal B is made more positive than terminal A and this accordingly represents the on time current period. The igniter valves 20 become conducting to fire the ignitrons 14 and 15, which thereupon pass current to the primary 11. Each ignitron will conduct only when its anode is positive but since the valves are reversely connected, the positive half cycles and also the negative half cycles of the alternating supply current are supplied to the primary winding.

The duration of the on time current period is controlled by the potentiometer 61, whereas, the off time current period is controlled by the potentiometer 46. By adjustment of the resistance 53 in the resistance-capacity network the peaking voltages developed by transformers 50 and 51 can be shifted in relation to the alterations in the supply line current and since the peaking voltages initiate both the on time and off time current periods it follows that said periods may be phased by adjustment of said potentiometer 53 with the cycles of the alternating supply line.

During the time the sequence control circuit is energized the condensers 54 and 63 alternately charge and discharge. In fact, condenser 54 is charged by the source of direct current even before the control circuit is energized and as a result the control grid 45 of the tube 25 is maintained negative so that the tube does not conduct. When the control circuit is energized by closing of contact 60 and opening of 56 the condenser 54 discharges through resistance elements 46 and 47. Eventually tube 25 is rendered conducting and by flow of current through path No. 1 a charge is maintained on the condenser 54. Just as soon as tube 25 stops conducting the condenser 54 will discharge again through the resistance elements 46 and 47. With respect to condenser 63 the same is normally maintained in a discharged condition, with charging of the condenser taking place while tube 25 is conducting. Said condenser 63 does not discharge until tube 27 is rendered conducting by a peaking voltage from transformer 51, the discharge of said condenser having the effect of terminating the on time current period.

Figure 3 embodies a simplification of the sequence control circuit shown in Figure 1. Said circuit is similar to the control circuit of Figure 1 with one or two exceptions. The vacuum diode tube 26 has been eliminated and condenser 180 with resistance elements 181 and 182 have been substituted for condenser 54 and resistance elements 46 and 47 of Figure 1. Accordingly the off time current period is obtained in the circuit of Figure 3 by action of said condenser 180 and the resistance elements 181 and 182. Similar elements in both figures have been indicated by the same numerals.

The on time current period is controlled by condenser 163 and tube 127 in a manner exactly as shown and described in Figure 1. During the on time current period when current flows through tube 124, tube 125 and resistor 136, the condenser 180 is charged and the polarity of the respective plates of the condenser will be as shown in said figure with the positive plate of the condenser being connected to the variable resistance element or potentiometer 181 and the negative plate being connected to the resistance element 182. Flow of current through the tubes and said resistor 136 is terminated by the action of the peaking transformer 170 which drives the grid 172 of tube 124 highly negative. After current has ceased to flow the tube 125 will be maintained non-conductive by the voltage across condenser 180. As condenser 180 discharges through the resistance elements 81 and 82 the control grid of said tube 125 becomes less negative and finally a point is reached at which a positive pulse from peaking transformer 150 drives the grid 145 of said tube beyond the critical point and tube 125 becomes conductive, whereupon current again flows through tube 124, 125 and resistor 136. The duration of the off time current period is changed by varying the potentiometer 181.

The action resulting from the sequence control circuit of Figure 3 in reversing the polarity of the terminals A and B is similar in all respects to that previously described in connection with Figure 1. Therefore it will be understood that during the off time current period terminal B will be negative with respect to terminal A. For the on time current period when terminal B is made positive with respect to A the igniter valves 20 will conduct the predetermined minimum current to the ignitrons 14 and 15, firing said ignitrons to thereby pass current to the primary 11 of the welding transformer for effecting a welding operation. The control circuit of Figure 3 is energized by closing of the contact 160.

In both forms of the invention, as shown in Figures 1 and 3, the sliders 33 and 133, respectively, are adjustable along the resistance 31 or 131 connected across the direct current supply.

As the sliders are moved toward the negative end of the direct current supply the potential difference between terminals A and B is decreased and conversely, as the sliders are moved toward the positive end, the potential difference between terminals A and B is increased. This adjustment makes possible a number of conditions with respect to the polarity of terminals A and B. As shown in both figures, the sequence circuit controls a welding system and accordingly the polarity of terminals A and B are alternately reversed to effect firing of the ignitrons 14 and 15. For other applications the sliders may be adjusted so that the polarity of said terminals are not reversed but instead the terminal B will be changed abruptly from a potential negative as regards A to a potential substantially the same as A. The sliders may have such an adjustment for welding purposes since the control valves 20 become conductive when their grids are brought to the same potential as their cathodes. It is not absolutely necessary to make their grids positive with respect to their cathodes for firing the ignitrons. Still another adjustment of the sliders will produce a condition where terminal A is at all times more positive than terminal B. The on and off periods produced by the sequence control circuit when adjusted in this manner would abruptly change the potential difference between A and B and as previously described the durations of said on and off periods may be varied independently of each other.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. In a control system, a source of alternating current, a pair of electric discharge valves of the immersed-ignition type connected in anti-parallel between said source and the load, a control valve for firing each discharge valve when the control valve is conducting, and a sequence control circuit for alternately rendering said control valves conducting and nonconducting, said circuit including a source of direct current, a resistor, a first timing valve having a series connection with the resistor, said valve and resistor being connected across the source of direct current, a capacitor connected to be charged by current flow in said direct current circuit and in circuit relation with said timing valve for maintaining said valve nonconductive when said capacitor is charged, a discharge circuit for said capacitor, means for periodically producing a peak voltage capable of rendering the timing valve conductive provided said capacitor has discharged through its discharge circuit to a predetermined extent, whereby direct current flows through said circuit when the timing valve is conductive to render said control valves conducting, a second timing valve having a parallel circuit relation with said resistor, a capacitor electrically associated with said second timing valve and connected to be charged by current flow in the direct current circuit, other means for periodically producing a peak voltage capable of rendering the second timing valve conductive provided the second capacitor has charged to a predetermined extent, said second capacitor discharging through the second timing valve upon conductivity of the valve, and means energized by the conductivity of said second timing valve for interrupting the flow of current in the direct current circuit, whereby the control valves are rendered nonconducting.

2. In a control system, a source of alternating current, a pair of electric discharge valves of the immersed-ignition type connected in anti-parallel between said source and the load, a control valve for firing each discharge valve when the control valve is conducting, and a sequence control circuit for alternately rendering said control valves conducting and nonconducting, said circuit including a source of direct current, a first timing valve in said circuit having connection across said source of direct current, a capacitor connected to be charged by current flow in said direct current circuit and in circuit relation with said timing valve for maintaining said valve nonconductive when said capacitor is charged, a discharge circuit for said capacitor having adjustable means for regulating the discharge rate of said capacitor, means electrically connecting with a source of alternating current for producing a peak voltage at periodic intervals of the alternating current, said peak voltages rendering the timing valve conductive provided said capacitor has discharged through its discharge circuit to a predetermined extent, whereby direct current flows through said circuit when the timing valve is conductive to render the control valves conducting, a second timing valve having a parallel circuit relation with the direct current circuit, a second capacitor electrically associated with said second timing valve and connected to be charged by current flow in the direct current circuit, means for regulating the charging rate of said second capacitor, other means electrically connecting with a source of alternating current for producing a peak voltage at periodic intervals of the alternating current, said peak voltages rendering the second timing valve conductive provided the second capacitor has charged to a predetermined extent, said second capacitor discharging through the second timing valve upon conductivity of the valve, and means energized by the conductivity of said second timing valve for interrupting the flow of current in the direct current circuit, whereby the control valves are rendered nonconducting.

3. For use in controlling the potential between a first terminal and a second terminal, the combination with a source of direct current, of a first resistor connected across said direct current source, said first terminal having connection with the positive end of the first resistor, said second terminal having connection through a second resistor with the negative end of the source of direct current, a first timing valve having an anode, a cathode and a grid, and connected in series relation with the second resistor, said valve and second resistor being connected across the source of direct current to provide a direct current circuit, a capacitor in the grid-cathode circuit of the timing valve for impressing a blocking potential on the grid thereof when the capacitor is charged thereby maintaining the valve non-conductive, a peaking transformer for producing secondary peak voltages from an alternating current source capable of neutralizing said blocking potential when the capacitor has discharged to a predetermined extent, thereby rendering said timing valve conductive whereby current will flow in said direct current circuit, a second timing valve having an anode, a cathode and a grid and connected in parallel circuit relation with said second resistor, a second capacitor in the anode-cathode circuit of the second timing valve and connected to be charged by current flow in the direct current circuit, a second peaking transformer for producing secondary peak voltages from an alternating current source capable of rendering said second timing valve conductive when the second capacitor has charged to a predetermined extent, said second capacitor discharging through the second timing valve upon conductivity thereof, and means energized by the conductivity of said second timing valve for interrupting the flow of current in the direct current circuit.

4. For use in supplying current from a source to a load, the combination comprising control valves for controlling the flow of current to the load, control means including a source of direct current providing a direct current circuit, a start valve having an anode, a cathode and a grid, an off-time capacitor in the grid-cathode circuit of said start valve and connected to be charged by current flow in the direct current circuit, said off-time capacitor when charged impressing a blocking potential on the grid of the start valve to maintain said valve nonconductive, means producing peak voltages from an alternating current source capable of neutralizing said blocking potential when the capacitor has discharged to a predetermined extent thereby rendering said start valve conductive, a stop valve having an anode, a cathode and a control grid, an on-time capacitor in the anode cathode circuit of the stop valve and having circuit relation with the start valve so that said on-time capacitor is charged as a result of current flow caused by the start valve becoming conductive, means producing peak voltages from an alternating current source capable of rendering said stop valve conductive when the on-time capacitor has charged to a predetermined extent, circuit means energized by the conductivity of the stop valve for interrupting said flow of current, and other means for controlling said control valves in accordance with the conductivity of the start valve.

5. For use in supplying current from a source to a load, the combination comprising control valves for controlling the flow of current to the load, a sequence control circuit including a source of direct current providing a direct current potential, first and second valves each having an anode, a cathode and a grid and connected in series circuit relation across said direct current source for effecting flow of direct current in the circuit when the first valve is conductive, an off-time capacitor in the grid-cathode circuit of said first valve for impressing a blocking potential on the grid thereof when the capacitor is charged to maintain the valve nonconductive, means neutralizing said blocking potential when the capacitor has discharged to a predetermined extent thereby rendering said first valve conductive, a third valve having an anode, a cathode and a grid and in parallel circuit relation with said circuit, an on-time capacitor in the plate-cathode circuit of the third valve, means for rendering said third valve conductive when the on-time capacitor has charged to a predetermined extent as a result of current flow in the series circuit, circuit means including said second valve for interrupting the flow of current in said series circuit as a result of the third valve becoming conductive to discharge the on-time capacitor, and other means for controlling said control valves in accordance with the conductivity of said first valve.

6. For use in supplying current from a source to a load, the combination comprising control valves for controlling the flow of current to the load, a grid element for each control valve, a sequence control circuit electrically associated with the grid elements for alternately rendering the control valves conducting and nonconducting, said circuit including a source of direct current, a first timing valve in said circuit and connected across said source of direct current, whereby current flows through said timing valve when the valve is conductive to impress an energizing potential on the grid elements to cause the control valves to conduct, a first capacitor electrically connecting with said direct current circuit and in circuit relation with said first timing valve, said capacitor by its rate of discharge controlling the period of time the said valve remains nonconductive, a second timing valve in parallel circuit relation with said direct current circuit, said second valve effecting interruption of current flow in said direct current circuit as a result of the same becoming conductive, whereby the energizing potential on the grid elements is discontinued, and a second capacitor in electrical association with said second timing valve and in circuit relation with said direct current circuit for controlling by its charging rate the period of time the second timing valve remains nonconductive after current starts to flow in said direct current circuit, said current flow in the direct current circuit operating to charge both first and second capacitors, whereby they are charged during the conducting period of the first timing valve, and means producing peak voltages from an alternating current source and having electrical connection with each timing valve for firing the valves independently of each other at a predetermined instant following action of the particular capacitor controlling the valve.

JULIUS L. SOLOMON.

REFERENCES CITED

The following references are of record in the file of this patent:

UNITED STATES PATENTS

| Number | Name | Date |
| --- | --- | --- |
| 2,250,202 | Matusita | July 22, 1941 |
| 2,303,453 | Gulliksen | Dec. 1, 1942 |
| 2,329,090 | Smith et al. | Sept. 7, 1943 |
| 2,340,077 | Pearson et al. | Jan. 25, 1944 |
| 2,372,129 | Smith | Mar. 20, 1945 |